(12) United States Patent
Willoughby

(10) Patent No.: US 6,183,046 B1
(45) Date of Patent: Feb. 6, 2001

(54) ADJUSTABLE ARMREST ASSEMBLY

(75) Inventor: Craig A. Willoughby, Beatrice, NE (US)

(73) Assignee: Exmark Mfg. Co., Inc., Beatrice, NE (US)

( * ) Notice: Under 35 U.S.C. 154(b), the term of this patent shall be extended for 0 days.

(21) Appl. No.: 09/609,962

(22) Filed: Jul. 5, 2000

(51) Int. Cl.[7] .................................................. A47C 7/54
(52) U.S. Cl. .................................. 297/411.38; 297/411.32
(58) Field of Search ............................. 297/313, 411.32, 297/411.35, 411.38

(56) References Cited

U.S. PATENT DOCUMENTS

| | | |
|---|---|---|
| 4,067,613 | 1/1978 | Pesiri . |
| 4,219,235 | 8/1980 | Heling . |
| 5,316,373 | 5/1994 | Markel ............................ 297/411.32 |
| 5,709,432 | 1/1998 | Gryp ............................... 297/411.32 |
| 5,769,496 | 6/1998 | Gryp ............................... 297/411.32 |
| 5,823,624 | 10/1998 | Dahlbacka ...................... 297/411.36 |

*Primary Examiner*—Peter R. Brown
(74) *Attorney, Agent, or Firm*—Zarley, McKee, Thomte, Voorhees & Sease; Dennis L. Thomte

(57) ABSTRACT

An adjustable armrest is provided for a riding lawn mower which normally has an operator's seat positioned thereon with the seat including armrests at either side of the seat. The armrests are normally pivotally movable from an operative position to an inoperative position. In the operative position, the armrests are designed to support the arms of the operator while the operator is manipulating the control levers of the mower. An adjuster plate is selectively rotatably mounted on each of the armrest support frames with the adjuster plate being selectively rotatably mounted with respect to the armrest support frame to selectively vary the amount of downward pivotal movement of the armrest. The adjuster plate has a bolt opening formed therein to facilitate the rotatable mounting of the adjuster plate on the support frame. The bolt opening is offset in at least two directions from the center of the adjuster plate so that the edges or ends thereof are spaced at different distances from the bolt opening.

19 Claims, 4 Drawing Sheets

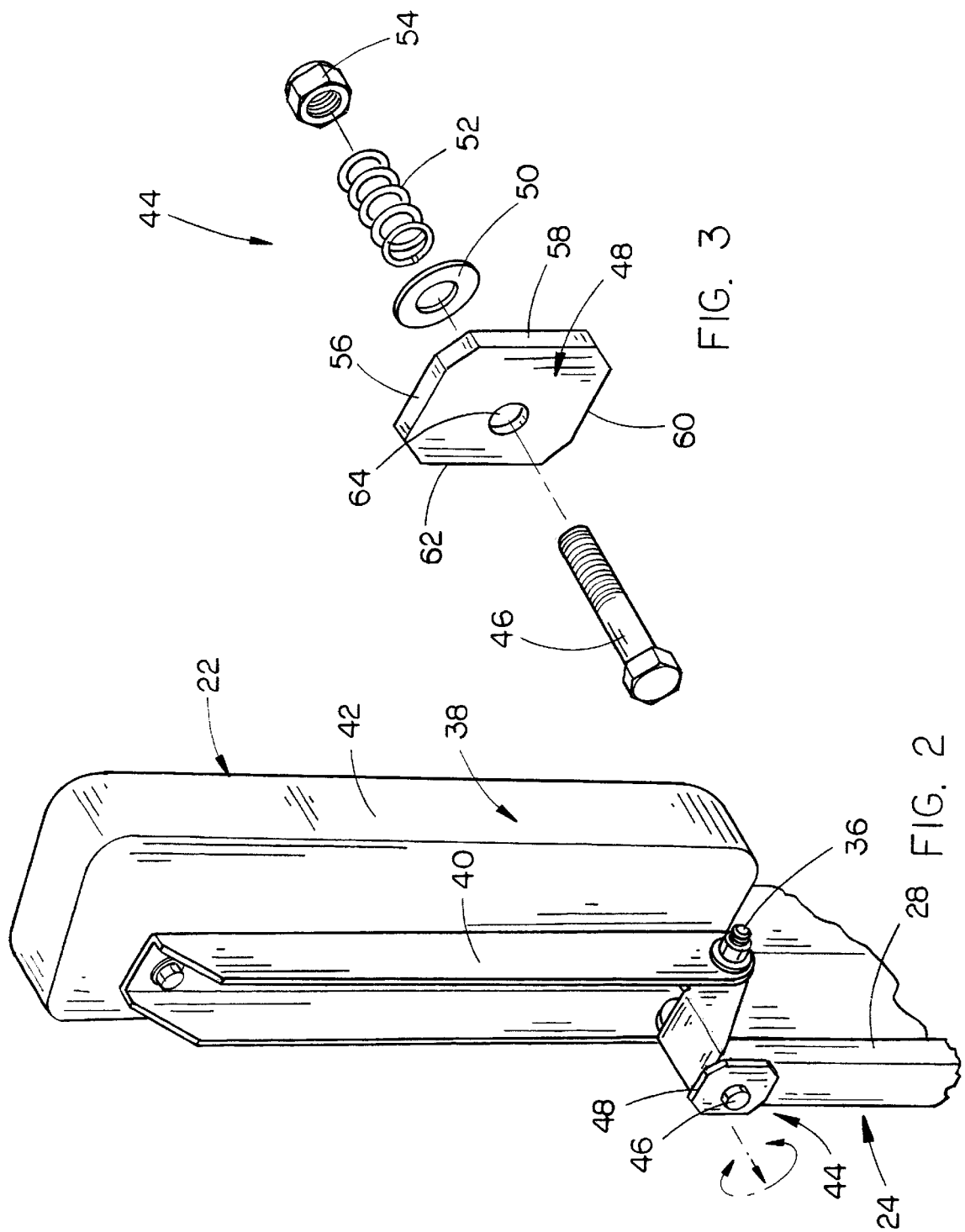

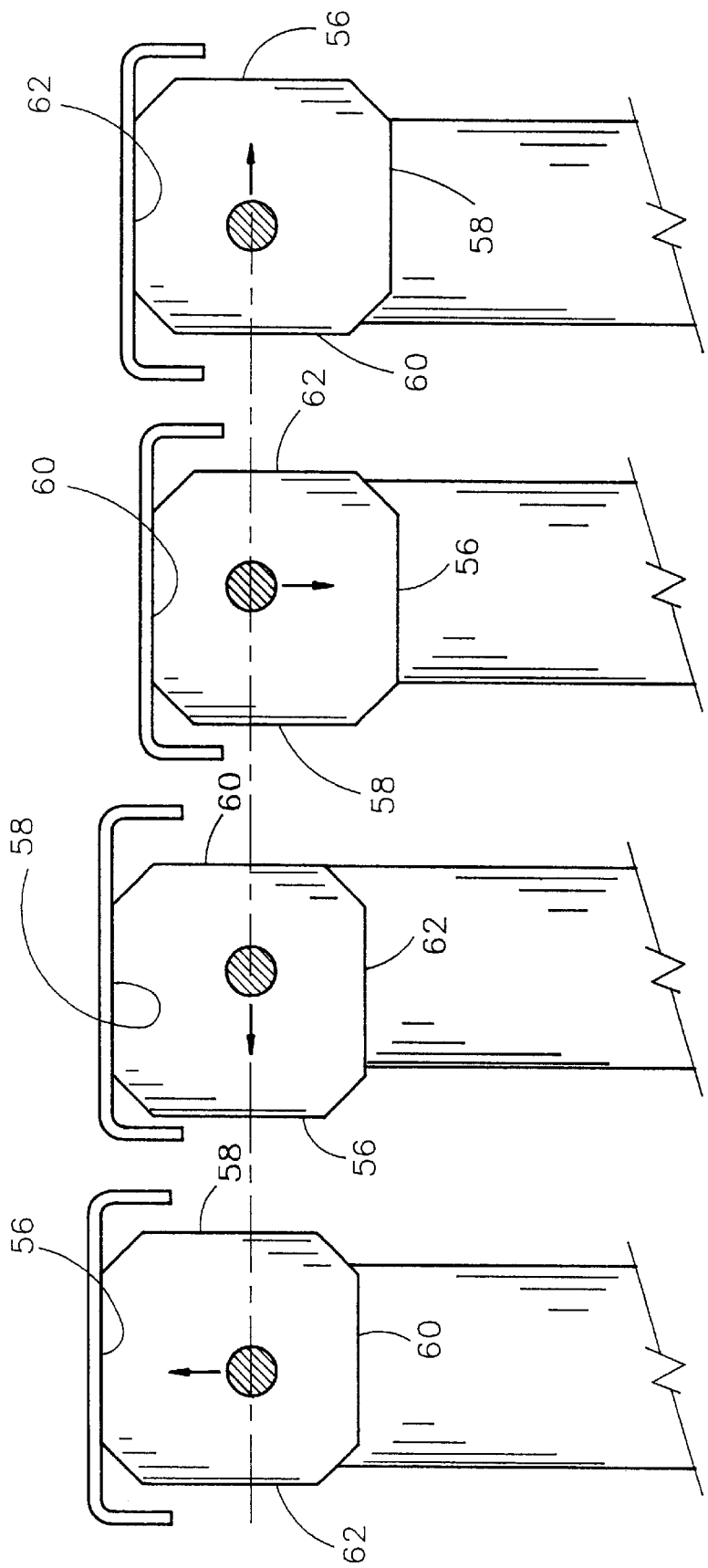

ADJUSTABLE ARMREST ASSEMBLY

BACKGROUND OF THE INVENTION

1. Field of the Invention

This invention relates to an adjustable armrest assembly and more particularly to an adjustable armrest assembly for a riding mower.

2. Description of the Related Art

Riding lawn mowers or mowers normally have an operator's seat positioned thereon with the seat including armrests at either side of the seat. Normally, the armrests are pivotally movable from a substantially horizontally disposed operative position to a substantially vertically disposed inoperative position. In the horizontally disposed position, the armrests are designed to support the arms of the operator while the operator is manipulating the control levers of the mower. It is desirable to be able to pivot the armrests to an upright position to enable the operator to more conveniently gain access to the seat and to enable the operator to easily disembark from the mower. Although the conventional pivotal armrests do generally perform their intended function, the armrests may not be the best suited for operator's having extremely long arms or extremely short arms. In other words, the arms of individual operators may not comfortably rest on the conventional armrests.

SUMMARY OF THE INVENTION

An adjustable armrest assembly is disclosed which is ideally suited for use on a riding lawn mower, although the adjustable armrest assembly of this invention could conceivably be used on other types of equipment wherein there is a need to vary the height of the armrest when the armrest is in its operative position. When the adjustable armrest of this invention is being used on a riding lawn mower, the operator's seat of the mower normally has an upstanding armrest support frame at either side of the seat. An armrest is pivotally secured, adjacent its rearward end, to the armrest support frame adjacent the upper end thereof with the armrest being pivotally movable between a substantially horizontally disposed position to a substantially vertically disposed position. The underside of the armrest is normally in engagement with the upper end of the armrest support frame when the armrest is in its substantially horizontally disposed position. An adjuster plate is selectively rotatably mounted on the armrest support frame and has an opening formed therein which is offset from the center thereof. The adjuster plate may be selectively rotatably moved with respect to the armrest support frame so that individual ends or edges of the adjuster plate will be disposed uppermost in the pivotal path of the armrest to vary the downward pivotal movement of the armrest.

It is therefore a principal object of the invention to provide an improved adjustable armrest assembly.

A further object of the invention is to provide an adjustable armrest assembly which is ideally suited for use on a riding lawn mower.

Still another object of the invention is to provide an adjustable armrest assembly wherein the armrest is conveniently adjustable through the use of an adjuster plate which is rotatably mounted on the armrest support frame.

It is yet a further object of the invention to provide an adjustable armrest assembly which may be mounted on an existing armrest assembly without extensive modification of the existing armrest assembly.

These and other objects will be apparent to those skilled in the art.

BRIEF DESCRIPTION OF THE DRAWINGS

FIG. 2 is a perspective view of the adjustable armrest assembly;

FIG. 3 is an exploded perspective view of the adjuster plate and its mounting components;

FIGS. 5A, 5B, 5C and 5D are views illustrating the various positions to which the adjuster plate may be rotated.

DESCRIPTION OF THE PREFERRED EMBODIMENT

Figure 1:
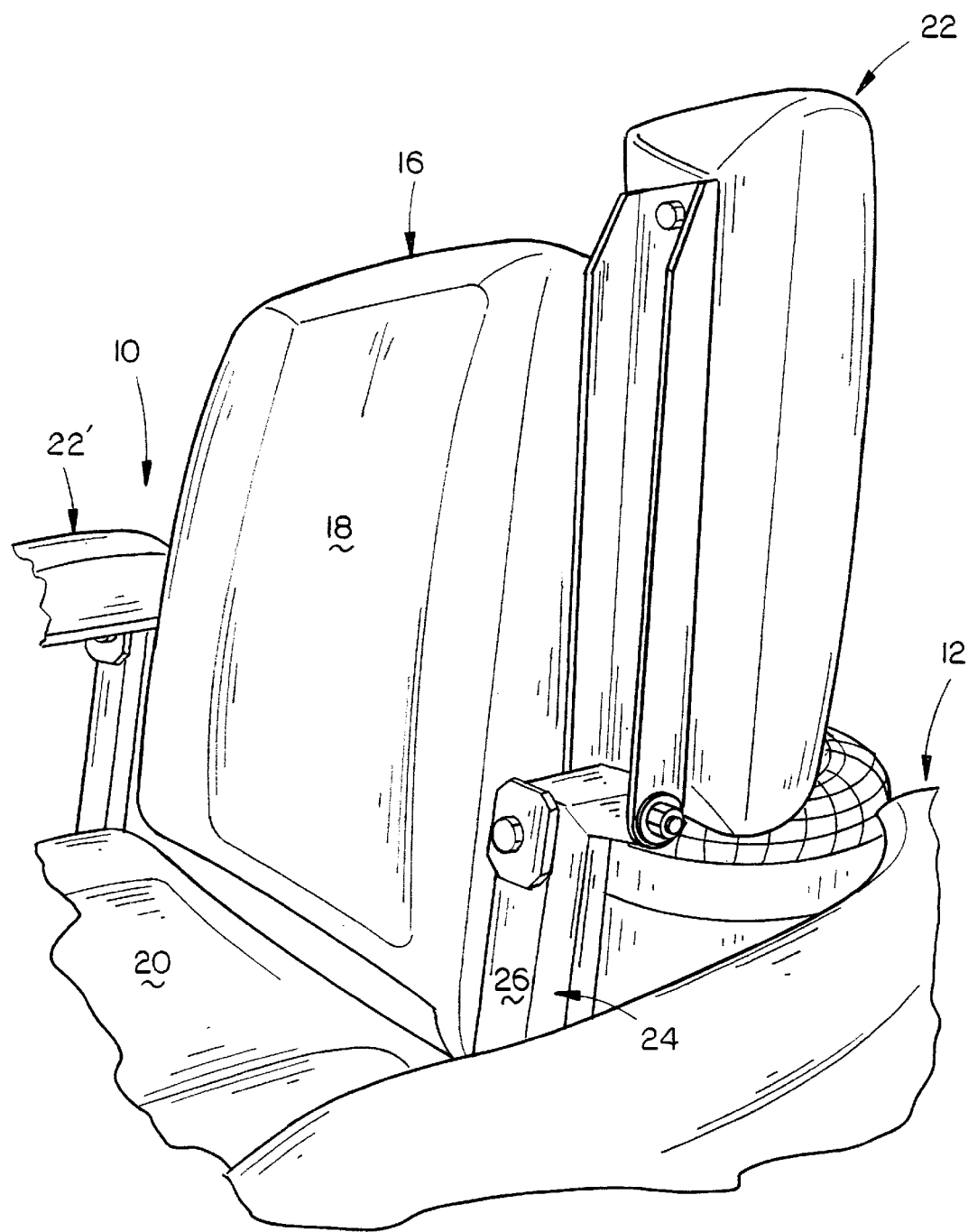
FIG. 1 is a perspective view of the adjustable armrest assembly of this invention mounted on a riding mower operator's seat.
Figure 4:
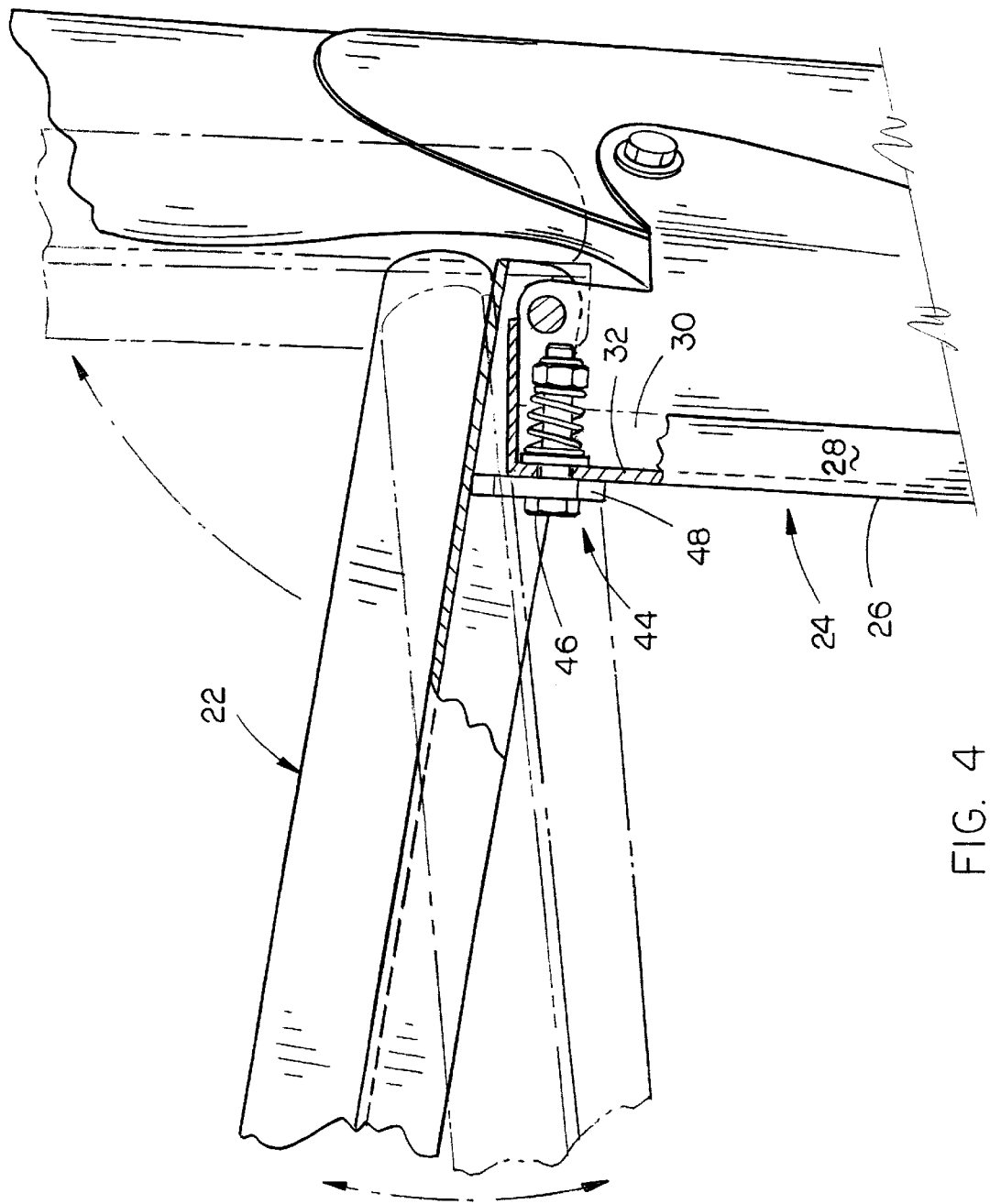
FIG. 4 is a partial sectional view of the invention.

The numeral 10 refers to a riding lawn mower such as manufactured by Exmark Mfg. Co., Inc. of Beatrice, Nebr., and identified as a Lazer Z. Mower 10 includes a wheeled frame means 12 having a mower deck at the forward end thereof. Mower 10 also includes an operator's seat 16 including a backrest 18 and seat cushion 20. Armrest assemblies 22 and 22' are provided at each side of the operator's seat 16. Inasmuch as the assemblies 22 and 22' are identical, only assembly 22 will be described in detail with "'" indicating identical structure on assembly 22'.

Armrest assembly 22 includes an upstanding frame member or armrest support frame 24 having a channel 26 at its forward end with the flanges 28 and 30 of the channel 26 facing rearwardly. As seen, web 32 extends between flanges 28 and 30 of channel 26.

The rearward end of support frame 24 is secured to the backrest 18. The upper end of support frame 24 is bent over laterally outwardly to form a channel-shaped upper end 34 including side portions 34A and 34B. Bolt 36 extends through side portions 34A and 34B to provide a pivot mount for the armrest 38 of the assembly 22. Armrest 38 includes a channel 40 which is pivotally mounted to support 24 by bolt 36. Armrest cushion 42 is secured to the channel 40 in conventional fashion.

As seen, armrest 38 is pivotally movable between a substantially horizontally disposed operative position to a substantially vertically disposed inoperative position. The downward pivotal movement of the armrest 38 is normally limited by engagement of the channel 40 with the upper end 34 of support frame 24.

The armrest construction described hereinabove is conventional to the Lazer Z mower as well as other mowers on the market. Although the invention to be described hereinafter is ideally suited for the Lazer Z mower, the invention will work equally as well on other brands of mowers which utilize pivoting armrests wherein the armrest is pivotally mounted on an upstanding support so as to be pivotally movable between a substantially horizontally disposed operative position to a substantially vertically disposed inoperative position and wherein the armrest rests upon a portion of the upper end of the support when the armrest is in its horizontally disposed operative position.

The armrest assembly 22 may be converted into an adjustable armrest assembly by the adjustment assembly of this invention which is referred to generally by the reference numeral 44. Assembly 44 includes a bolt 46, adjuster plate 48, washer 50, spring 52 and nut 54. Although plate 48 may take several different shapes, a preferred embodiment is shown in the drawings. For purposes of description, plate 48 will be described as including ends or edges 56, 58, 60 and 62. Preferably, the corners of the plate 48 are tapered or beveled, as seen in the drawings, to eliminate sharp corners on the plate 48 and to facilitate reception of the plate 48 in the channel 40.

Plate 48 is provided with an opening 64 formed therein which is offset in two directions from the center of the plate 48. As seen, opening 64 is positioned closer to end 62 than to end 58 and is positioned closer to end 60 than end 56.

A hole or opening 66 is drilled in the upper end of web 32 of channel 26. Plate 48 is positioned at the forward side or end of channel 26 so that opening 64 of plate 48 is aligned with opening 66. Bolt 46 is then extended rearwardly through opening 64 in plate 48 and through opening 66 in channel 26. Washer 50 embraces bolt 46 at the rear surface of web 32 of channel 26 with spring 52 being mounted on the bolt 46 rearwardly of washer 50. Nut 54 is threadably mounted on the rearward end of bolt 46 to maintain the assembly 44 on support 24 while permitting selective rotation of plate 48 with respect to support 24.

The adjuster plate 48 may be selectively positioned with respect to support 24 so that end 60 is aligned with the upper end 34 of support frame 24, as seen in FIG. 5C, so that the armrest may be pivotally moved to its conventional substantially horizontally disposed operative position. The adjuster plate 48 may be rotated so that the ends 56, 58 and 62 may be selectively positioned above the upper end of channel 26 to selectively limit downward pivotal movement of armrest 38, as seen in FIGS. 5A, 5B and 5D, respectively, thereby providing an adjustable armrest assembly to accommodate persons of different statures and arm lengths. When the armrest 38 is in its operative position, the upper end of the plate 48 is received by channel 40, as seen in FIGS. 5A, 5B, 5C and 5D. If the conventional armrest is found to be positioned too low for most operators, the opening 64 in plate 48 could be offset in two directions from the center of the plate 48 such that in all four of its positions, the uppermost ends of the plate 48 will be positioned above the upper end of channel 26.

Although the adjuster plate 48 is illustrated in the drawings as being rotatably mounted on the support frame 24, the adjuster plate 48 could be mounted on a structure other than support frame 24 so that the adjuster plate 48 is in the pivotal path of the armrest 38.

Thus it can be seen that the invention accomplishes at least all of its stated objectives.

I claim:

1. An adjustable armrest assembly positioned at one side of a seat, comprising:
    an upstanding armrest support frame having an upper end, a forward end, and a rearward end;
    an armrest having a forward end and a rearward end;
        said armrest being pivotally secured, adjacent its rearward end, to said armrest support frame adjacent the upper end thereof;
        said armrest being pivotally movable between an operative position to an inoperative position;
        said armrest normally being in engagement with said upper end of said armrest support frame when said armrest is in its said operative position;
    and an adjuster plate selectively rotatably mounted on said armrest support frame;
        said adjuster plate having at least spaced-apart first and second edges;
        said adjuster plate having an opening formed therein;
    a bolt means extending through said opening in said adjuster plate and said armrest support to rotatably mount said adjuster plate on said armrest support plate;
        said opening in said adjuster plate being positioned closer to one of said first and second edges than to the other of said first and second edges whereby said adjuster plate may be selectively rotated with respect to said armrest support frame to position either said first or second edge uppermost to adjustably limit the downward movement of said armrest.

2. The structure of claim 1 wherein said adjuster plate has at least third and fourth edges extending between said first and second edges and wherein said opening in said adjuster plate is positioned closer to one of said third or fourth edges than to the other of said third or fourth edges.

3. The structure of claim 2 wherein said adjuster plate has beveled portions between adjacent edges.

4. The structure of claim 1 wherein said bolt means is spring-loaded to yieldably maintain said adjuster plate in a selected position with respect to said armrest support frame.

5. The structure of claim 1 wherein said adjuster plate has a plurality of edges.

6. The structure of claim 5 wherein said opening is offset in at least two axial directions to provide a plurality of height adjustments to said armrest.

7. The structure of claim 1 wherein said armrest includes a channel-shaped frame member which partially receives said adjuster plate therein when said armrest is in its said operative position.

8. The structure of claim 1 wherein said adjuster plate is positioned forwardly of the armrest support frame.

9. In combination:
    a riding lawn mower having an operator's seat mounted thereon;
        said operator's seat including an adjustable armrest assembly positioned at least at one side of said seat;
        said adjustable armrest assembly comprising:
            an upstanding armrest support frame having an upper end, a forward end, and a rearward end;
            an armrest having a forward end and a rearward end;
                said armrest being pivotally secured, adjacent its rearward end, to said armrest support frame adjacent the upper end thereof;
                said armrest being pivotally movable between an operative position to an inoperative position;
                said armrest normally being in engagement with said upper end of said armrest support frame when said armrest is in its said operative position;
            and an adjuster plate selectively rotatably mounted on said armrest support frame;
                said adjuster plate having at least spaced-apart first and second edges;
                said adjuster plate having an opening formed therein;
        a bolt means extending through said opening in said adjuster plate and said armrest support to rotatably mount said adjuster plate on said armrest support plate;
            said opening in said adjuster plate being positioned closer to one of said first and second edges than to the other of said first and second edges whereby said adjuster plate may be selectively rotated with respect to said armrest support frame to position either said first or second edge uppermost to adjustably limit the downward movement of said armrest.

10. The combination of claim 9 wherein said adjuster plate has at least third and fourth edges extending between said first and second edges and wherein said opening in said adjuster plate is positioned closer to one of said third or fourth edges than to the other of said third or fourth edges.

11. The combination of claim 10 wherein said adjuster plate has beveled portions between adjacent edges.

12. The combination of claim 9 wherein said bolt means is spring-loaded to yieldably maintain said adjuster plate in the selected position with respect to said armrest support frame.

13. The combination of claim 9 wherein said adjuster plate has a plurality of edges.

14. The combination of claim 13 wherein said opening is offset in at least two axial directions to provide a plurality of height adjustments to said armrest.

15. The combination of claim 9 wherein said armrest includes a channel-shaped frame member which partially receives said adjuster plate therein when said armrest is in its said operative position.

16. The combination of claim 9 wherein an adjustable armrest assembly is positioned at both sides of said operator's seat.

17. The combination of claim 9 wherein said adjuster plate is positioned forwardly of said armrest support plate.

18. The combination of claim 9 wherein said adjuster plate is disposed in an upstanding position.

19. An adjustable armrest assembly positioned at one side of a seat, comprising:

an armrest support having a forward end and a rearward end;

an armrest having a forward end and a rearward end;

said armrest being pivotally secured to said armrest support;

said armrest being pivotally movable between an operative position to an inoperative position;

said armrest normally being in engagement with said armrest support when said armrest is in its said operative position;

and a rotatable adjuster plate positioned below said armrest;

said adjuster plate having at least spaced-apart first and second edges;

said adjuster plate having an opening formed therein;

a bolt means extending through said opening in said adjuster plate to rotatably mount said adjuster plate;

said opening in said adjuster plate being positioned closer to one of said first and second edges than to the other of said first and second edges whereby said adjuster plate may be selectively rotated to position either said first or second edge uppermost to adjustably limit the downward movement of said armrest.

* * * * *